NO PRINTED SPECIFICATION AVAILABLE
6074X
J. Millard.
Shot Machine.
Patented July 10, 1830.
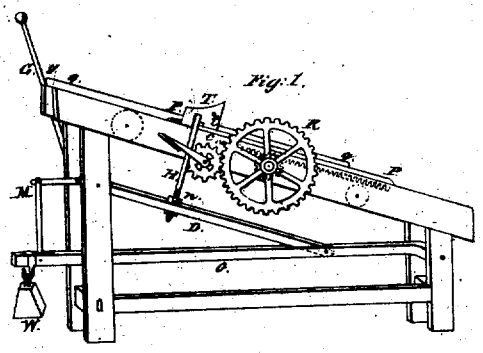
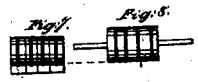
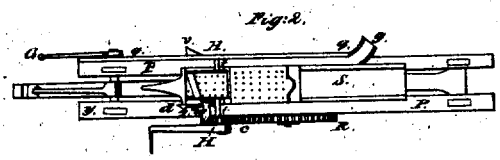
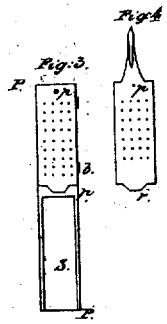
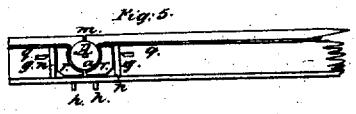
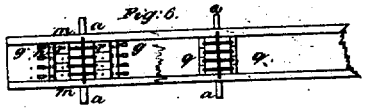
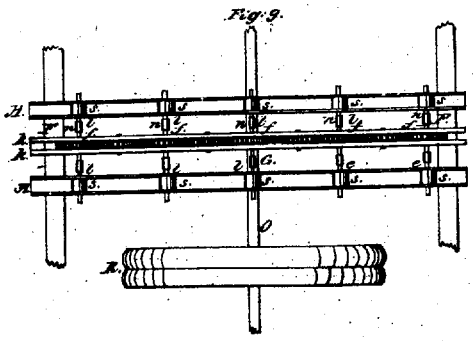

July 12 1830 [illegible]

Julius Willard of the city ^of Baltimore & State of Maryland.

Letters Patent. X6074

The schedule referred to in these Letters Patent and making part of the same, containing a description in the words of the said Julius Willard himself of his improvement in the machine for making shot, musket and rifle bullets called Willards Patent Shot-machine To all to whom these presents shall come Be it known that I Julius Willard of the City of Baltimore and State of Maryland have invented a new and useful machine for making shot musket and rifle balls. called Willards Patent Shot Machine; and that the following is a full & exact description of the construction and operation of the said machine as invented by me. — The machine consists of two parts the cutting bench by which the shot or balls are ^first rudely formed and the Rolling machine or frame by which they are made spherical by rolling and compression. — In the annexed drawings fig^s 1.2.3 & 4 are views of the cutting Bench, & its machinery Fig. 1 being an upright view and Fig 2. a birds eye view of the same It consists of a substantial wooden frame or bench, the top rails of which form an inclined plane upon which and in the space included between them slides the Iron mould plate (P. P.) which is furnished on its under side with a rack, (dotted in Fig. 1.) 3 that works in a pinion on the axle of the large cog wheel (R) which is acted on by the crank (F) of the small cog wheel (C) and causes the mould and its fixtures to move up and down the plane at the pleasure of the operator. To relieve the friction occasioned by the sliding of the mould plate either rollers or slides are placed under it as dotted in Fig 1. — Fig. 3, and 4. show the iron mould plate which is in two pieces, more distinctly, Fig. 3. being

X6074 the lower part which is made fast by two hinges a, b. to a block of
wood faced with sheet iron or to an iron plate, it has its upper [illegible]
face fitted as seen in the figure with a convenient number of moulds
each being a hemisphere of the shot, or ball, that is to be moulded
the lower end (S, of the block or plate, is hollowed out into a
valley or shoot, Fig 4. the upper part or lid of the mould
which is about half the thickness of the diameter of the shot or
ball, is fitted on its under side, so as to match the lower plate.
and is perforated opposite to these pits with small holes or gate
ways which communicate from the upper side with the
hollow spheres formed by the pits in the plates when laid together
the plates being also supplied with an adjusting pin (p) and a
bevelled point (P) so as to bring the hemispherical pits ex
=actly opposite to each other, and the upper plate is prolonged
into a hooked form as seen in the drawing Fig. 4 which
serves for a handle, — T is a sheet iron box or hopper
without a bottom its lower edge is attached to a square
brass frame having a knife f (Fig 3.) placed obliquely across
the edge, of which lays in the same plane, with the lower
surface of the brass frame; the frame projects over the out
-side of the box. and the outer edges corresponding to the sides
of the mould, are turned down; or strong pieces are screwed
thereon for the purpose of keeping it on the mould when the
latter is moving up the plane — The frame also has two
small fixed points (l.l.) to prevent the hopper from following
the mould, by stopping it against the iron brace hooks H.H.
which are attached to the bar or lever, D, by the regulating
screws, and nuts n, n, from the top of which they branch
and rising along a groove, in the inner or outer sides (as
shown in the drawing) of the top rails of the bench are
turned inwards, and downwards and when the lever D, is act
on by the lever O, to which the weight W is suspended, [illegible]
on the upper surface of the brass frame of the hopper and keep it

X6074 in close contact with the surface of the mould plate. G is a
hand lever connected by an axis with the compound lever
M. and is only intended to relieve the pressure of the brace
hooks, when the hopper is to be removed by throwing it
back, into the ketch (v Fig 2) on the side of the top rail
g.g. is a strip of plank, or sheet iron, attached to the outer
side of the top rail and rising a few inches above it has
a small apron g. at its lower end, forming together with
the top surface of the rail, which is faced with sheet iron
and a very narrow strip of sheet iron fixed edgewise on the
rail next to the mould, a shoot to convey the shot, when cast
as will be seen, — In using the casting bench, the mould
is moved down the plane, until it is stopped by the spring
ketch (d) on the side of the mould, which was omitted in
the description against a fixed pin (L) in the top of the rail
The hopper is then placed on the mould and pressed down
by the brace hooks by throwing out the lever (G) A sufficient
quantity of melted lead for a cast is thrown into the hopper
the crank F is turned, the hopper remains stationary and
the mould is made to ascend the plane till the spring ketch
on its side takes hold on a fixed pin y) at the upper part
of the plane during this motion the moulds fill, and the
oblique knife f. cleans the lid of the mould also the distance
is so regulated that the lower part of the hopper at the end
of the motion projects over the shoot or valley (S.) and the
lead which may still remain in the hopper in a fluid
state runs off is caught by the boy in a ladle and returned
to the kettle again the lever G is then thrown back into the
ketch v. which relieves the pressure of the braces on the
hopper, the latter is then lifted off for which purpose it is
supplied with a handle or, after which the mould is dis
charged by turning it upon its edge (for which purpose the
hinges mentioned in the description are intended) in the shot-

X6074 formed along the top of the rail and striking it a blow or two with a stick, It may be proper to mention that a little [illegible] [illegible] be occasionally applied to the mould when hot The Rolling frame consists of several parallel wooden boxes or troughs A,A, &c Fig 7 supported on frame F.F. so as to have a gentle inclination also parallel and in the same plane with the boxes two strong pieces of thick plank, or joists K.K. are set up edgewise and strongly framed together forming a bearing for a system of equal spur wheels the journal of every other one of which ffff. &c, projects on both sides and being square is connected by means of square connecting bands or tubes n, n, &c, to the ends l,l,l,l, &c of the square journals of the rollers S.S.S.S. &c, opposite thereto and contained in the trough A,A and the square journals of the rollers are connected in a similar manner to the rollers of the next trough and so on so that when the middle spur wheel at G is made to revolve by means of the great wheel, R, (The strong bearings of whose axle (Q) are omitted in the drawing). the rollers in all the boxes, revolve together, and in the same direction, In place of spur wheels, wooden pulleys may be substituted, with a separate band to each winding on a drum fixed on the axle (Q) of the great wheel which will reduce the friction considerably in order to a more minute description of the rollers contained in the boxes Figs 5.& 6 are varied views of a part of the same in fig 6. which is a birds eye view) (A) is the roller, made of cast iron a, a, its projecting square journals ffff &c. are longitudinal half round or nearly half round grooves. which may be 3. 4. or 5 in number, according to the size of the shot or balls; corresponding to these grooves are cast iron dies r, r, r, &c adapted to the cylindrical circumference of the roller, and each being something more than a quadrant, so that each pair of dies embraces more than half the circumference of the roller and when they are set

X 6074 up-edge-wise in the trough and opposite their respective grooves
in the roller a cylindrical [illegible] is formed by their grooves and
the grooves of the roller, the dies are dropped in loosely and are
only confined by the regulating screws g.g.g.g. h.h. &c. fixed
in the upright wooden pieces n.n. and the bottom of the box
which upright pieces also serve as points of attachment for
the sheet iron plates or floors q.q. Fig 5. between the rollers
upon which the shot roll from one roller to the other, and in
passing over them change their position, also a small plate
of sheet iron (m.m.) is let into the sides of the shoot to
prevent the shot from passing over the roller, Figs. 7 & 8.
are side views of a roller and the concave surface of the
dies of one side thereof. The operation of the rolling frame
is as follows when the shot are cast as above described they
are first boarded to separate the very defective ones if any they
are then thrown into a barrel with a small quantity of
black lead after being agitated for a short time for the purpose
of coating them slightly with the lead, which prevents them
from adhering to each other in the rolling process, they are
poured in proper quantities into small hoppers (not shown
in the drawing) at the highest ends of the boxes A.A &c the
rollers being set in motion the shot are taken in by the
grooves of the first roller, partly rounded and thrown out
on the sheet-iron floor below it they descend to the next
roller in passing through which their shape is still farther
improved and so on till passing through the 5th and last
roller, which is the number I use, and have found to be suf-
ficient, they come out ready for polishing. the manner of
doing which it may be necessary to mention, as I have found
the common method used for drop shot not to answer
so well. — It consists simply in a [illegible] wire drum with
wooden heads having gudgeons and a crank or any other
contrivance by which it may be revolved, a quantity of

X6074 of the shot are put into it and a small quantity of [illegible]
lead it is then turned till the shot has the desired polish
after which they are taken out and [illegible] in the common
way, — Now what I claim as new and as my invention
is the casting Bench and Rolling frame and their machinery
as herein described applied to the purpose specified.
Given under my hand and seal this 5th day of July 1830

Witnesses
A. McIntire
Wm. P. Elliot

Julius Willard

[illegible]

207602